Feb. 26, 1957 R. L. LOKEY 2,782,584
DISC TYPE LAWN EDGER
Filed March 25, 1955 2 Sheets-Sheet 1
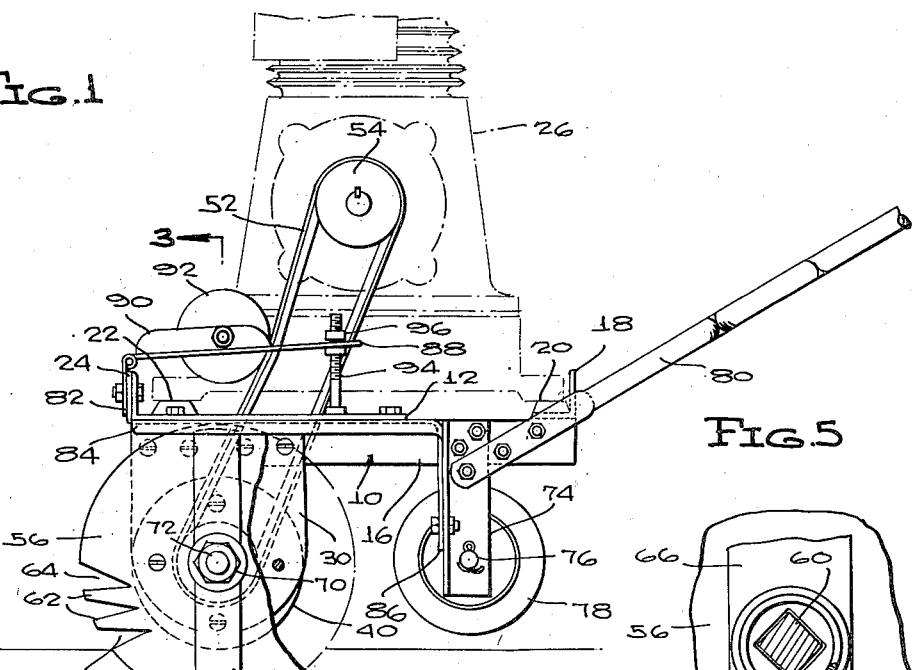
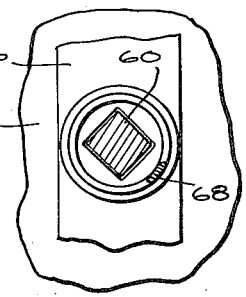
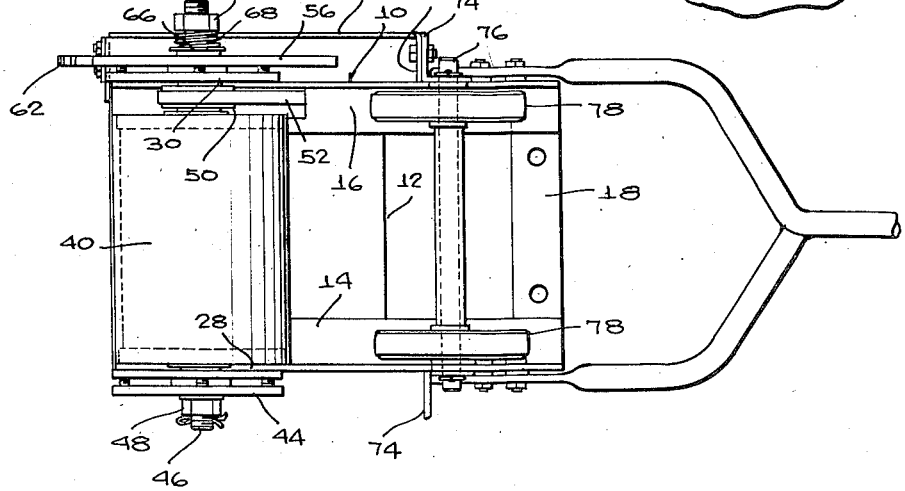
INVENTOR.
ROBERT L. LOKEY
BY
McMorrow, Berman + Davidson
ATTORNEYS Feb. 26, 1957 R. L. LOKEY 2,782,584
DISC TYPE LAWN EDGER
Filed March 25, 1955 2 Sheets-Sheet 2
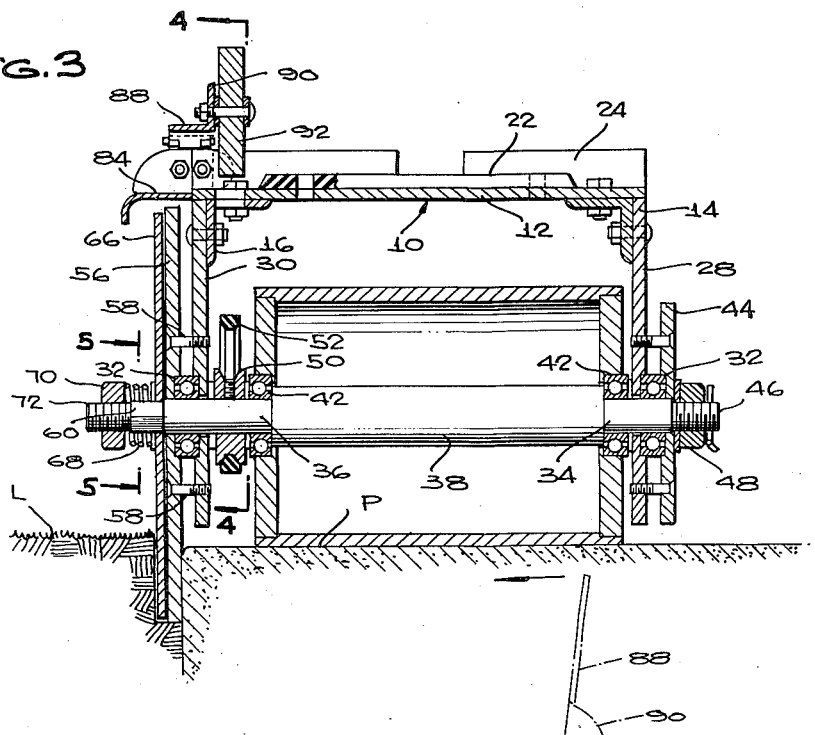
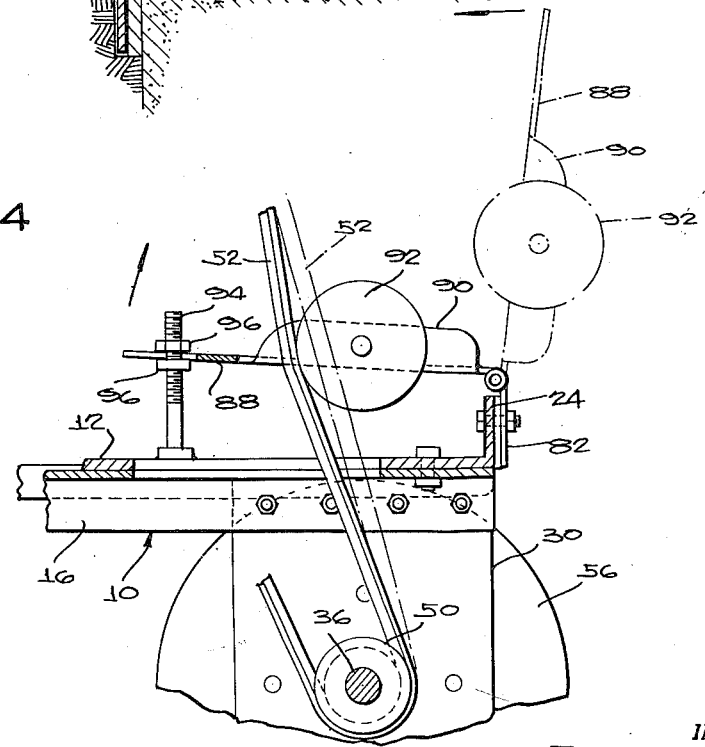
INVENTOR.
ROBERT L. LOKEY
BY
McMorrow, Berman & Davidson
ATTORNEYS United States Patent Office 2,782,584
Patented Feb. 26, 1957

2,782,584

DISC TYPE LAWN EDGER

Robert L. Lokey, Chula Vista, Calif.

Application March 25, 1955, Serial No. 496,759

3 Claims. (Cl. 56—25.4)

This invention relates to a power lawn edge trimmer, and more particularly, has reference to an edge trimming machine of the type referred to wherein a rotary knife and stationary knife disc have a particular relative formation and arrangement that especially well suits the device for neatly trimming the edge of a lawn adjacent a concrete wall, pathway, drive, or the like.

One object of importance is to provide a novelly designed and efficiently acting trimming knife assembly, comprising a stationary disc having a series of comb teeth particularly adapted for disposing the grass to be cut in the path of a knife blade rotating at high speed, for cutting of the grass by said blade.

Another object of importance is to so form and arrange the rotating knife blade and stationary knife disc as to cause the same to occupy a minimum of space in a transverse direction, said space being no greater than the combined thicknesses of the blade and disc, thus to neatly trim the grass substantially evenly with the edge of the walk along which the trimming operation is being conducted.

Still another object is to arrange the knife blade and stationary disc in such a manner that the knife blade will be self-sharpening during operation.

A further object of importance is to provide a lawn edge trimmer which will be highly compact, readily removable, rugged, and trouble free in operation.

Yet another object is to provide, in association with the rotary knife blade, a drive means extending from a supported engine, which drive means will be equipped with a belt-tension-adjusting assembly that will permit tensioning of a drive belt with a high degree of accuracy so far as the exact tension desired is concerned.

A further object of importance is to provide an assembly of component parts of the lawn edge trimmer that will particularly facilitate assembly and disassembly thereof, thus to make easier the performance of cleaning, maintenance, and repair operations.

Other objects will appear from the following description, the claims appended thereto, and from the annexed drawing, in which like reference characters designate like parts throughout the several views, and wherein:

Figure 1 is a side elevational view of a lawn edge trimmer formed in accordance with the present invention, the engine used in association therewith being shown in dotted lines;

Figure 2 is a bottom plan view;

Figure 3 is a transverse sectional view on line 3—3 of Figure 1;

Figure 4 is an enlarged, detail sectional view showing the belt-tension-adjusting means, substantially on line 4—4 of Figure 3; and Figure 5 is a still further enlarged detail sectional view on line 5—5 of Figure 3.

The lawn edge trimmer constituting the present invention includes a supporting frame generally designated at 10, said frame including a flat, rectangular, engine support platform 12. Fixedly secured to the underside of the engine support platform, at opposite sides of said platform, are coupling rails 14, 16 of right angles cross section, the rear end portions of said rails extending rearwardly of the engine platform a substantial distance. At their rear ends, the coupling rails are fixedly secured to opposite ends of a cross brace 18 on which is supported an elongated rear engine motor mount of resilient material such as rubber, extending over a substantial part of the length of the cross brace.

A similar front engine mount 22 is provided upon the front end portion of the platform, extending transversely of the platform, in closely spaced relation to an upstanding, transversely disposed end flange 24 integrally formed upon the front edge of the platform. An engine 26 is supported on the respective motor mounts, and is bolted or otherwise firmly attached to the frame in any suitable manner. Although the illustrated engine is an internal combustion engine, it will be understood that any other type of prime mover, such as an electric motor, can be used.

Bolted to the depending portions of the respective coupling rails 14, 16 are side plates 28, 30, said side plates being disposed at the front end of the frame. The side plates are provided with transversely aligned bearing openings, in which are mounted main shaft bearings 32 through which extend reduced, cylindrical extensions 34, 36 of a knife drive shaft 38, the extension 36 being somewhat longer than the extension 34 as shown in Figure 3. On the main, large diameter portion of the shaft 38 there is rotatably supported a drum 40, adapted to roll along the pavement P, the ends of the drum being apertured to receive bearings 42 carried by the extensions 34, 36 at opposite ends of the large diameter main portion of shaft 38.

A circular bearing and retaining disc 44 is secured by circumferentially spaced bolts to the side plate 28, a short distance outwardly from side plate, and projecting outwardly from the retaining disc 44 and integrally formed upon the extension 34 is a reduced, threaded, axial projection 46 of the shaft 38, on which is threaded a nut 48 bearing against the disc 44. A washer is interposed between the nut and disc, and it will be understood that washers, cotter keys, and similar means can be used whenever desired throughout the assembly to promote efficient operation.

Secured by a set screw or the like to the extension 36 is a driven pulley 50 around which is trained a drive belt 52, also passed (Figure 1) about a drive pulley 54 on the engine 26.

A stationary knife disc 56 of a diameter substantially greater than that of the drum is secured by an annular series of bolts 58 to the side plate 30, a short distance outwardly from said side plate. The stationary knife disc 56 is disposed at the outer end of the shaft extension 36, and integral with said outer end of the shaft extension is a non-circular shaft portion 60.

As shown in Figure 1, the stationary knife disc, at one location on the periphery thereof, is formed with elongated comb teeth 62 of approximately triangular outer configuration having blunt outer ends, said comb teeth extending silghtly obliquely to lines drawn radially of the stationary knife disc. The two comb teeth 62 define three combing notches 64 of V-shape, said notches also being disposed obliquely to lines drawn radially of the stationary knife disc. As will be noted, the comb teeth and notches are disposed at the leading edge of the knife disc, with the lowermost notch being disposed with the outer end of its lower edge terminating at a horizontal plane tangent to the lowermost portion of the drum 40.

A rotating knife blade 66 is formed as a wide, flat, blunt-ended bar, disposed in face-to-face contact with the stationary knife disc 56, as shown in Figure 3, and terminating at its ends close to the circumference of the stationary knife disc, thus to traverse the several comb teeth and notches. A spring 68 bears against the outer surface of the blade, and is held under compression between the blade and a nut 70 threaded upon an axial projection 72 integrally formed upon the non-circular shaft portion 60.

Bolted to the coupling rails 14, 16, adjacent the rear extremities of said coupling rails, are depending rear wheel support bars 74 of right-angled cross section, having transversely aligned openings receiving the oposite ends of a rear wheel axle 76 on which is rotatable a pair of rear wheels 78 slightly smaller in diameter than the drum 40. A handle 80 is secured to the coupling rails and the bars 74, and extends in an inclined position upwardly from the rear end of the frame. It will be understood that the handle can be adjustable if desired, in a commercial embodiment, so as to be disposable at the elevation found most comfortable to the particular user.

Referring now to the belt-tension-adjusting means, a stationary hinge leaf 82 is bolted to the upstanding front end of a knife guard 84 of elongated formation extending along one side of the platform 12 (Figures 1 and 3). The guard 84 has a downwardly curved outer side edge to protectively enclose the knife blade and knife disc assembly at the upper portions of said assembly. The guard 84 is integrally formed at its rear end with a depending extension bolted to the adjacent rear wheel support bar 74.

Pivotally connected to the stationary hinge leaf 82 is a swinging hinge leaf 88, swinging about a horizontal axis between the full and dotted line positions shown in Figure 4. Leaf 88 intermediate its ends has an upstanding side flange 90 formed with a bearing opening receiving a stub axle on which is freely rotatable an idler pulley or roller 92. The roller 92, when the hinge leaf 88 is swung downwardly, bears against one flight of the drive belt, to press the same inwardly, thereby to adjust the tension of the drive belt as desired.

At its free end, the swinging leaf 88 has a longitudinal slot, open at one end, said slot being adapted to receive the upwardly projecting stud 94 fixedly secured at its lower end to the frame. A pair of lock nuts 96 are threaded on the stud, and bear against the upper and lower surfaces of the leaf 88, to fixedly retain the same in any selected position of swinging adjustment thereof. By reason of this arrangement, the tension of the belt can be adjusted within a very close range, as will be readily apparent.

In use of the device, it is rolled upon a walk or pavement P adjacent the lawn L to be trimmed, in the position shown in Figure 3. The stationary knife disc is disposed against one side edge of the pavement, while the rotating knife blade is, as previously noted, in contact with the outer surface of the stationary disc. Thus, the stationary knife disc and blade are adapted to extend downwardly below the plane of the upper surface of the walk, to trim the edge of the lawn close to said walk. It will be noted that the lawn is trimmed substantially even with the side of the walk, due to the fact that the swath cut through the grass is no greater than the combined thicknesses of the stationary knife disc and the rotary blade.

With the engine in operation, one moves the device along the walk, and the rotary blade will rotate at high speed, so as to be kept in a sharp condition due to its contact over its full area with the stationary, adjacent disc 56. The disc 56, due to the particular formation and arrangement of the comb teeth and notches, will pick up the grass to be trimmed, and will dispose the same in the path of the rotary blade, which, traversing the teeth and notches, will cut the grass evenly, to provide an attractive, trimmed edge along the side of the walk.

In this connection, the three notches employed in a preferred embodiment are all disposed at the leading edge of the disc along that part of the circumference of the disc that would engage stalks of grass, weeds, etc. extending transversely of the plane of the disc and therefore located where they should be cut. The notches are deep and narrow, and it will be noted that the top edge of the lowermost notch is inclined slightly from the horizontal, while the top edge of the intermediate notch is inclined slightly more from the horizontal, the top edge of the uppermost notch being inclined still more from the horizontal. The top edges of all the notches are thus inclined upwardly toward the periphery of the disc.

The construction will cause stalks that project across the plane of the stationary disc at an elevation no higher than the top edge of the lowermost notch to be guided into said lowermost notch in immediate proximity to the notch edge against which they are to be cut by traverse of the rotating knife 66 across the notch. The stalks at a slightly higher elevation, no higher than the top edge of the intermediate notch will be guided into the intermediate notch, and these also will thus by this action, be disposed in immediate proximity to a stationary cutting edge on which they are sheared by rotation of the knife. Stalks extending across the plane of the stationary disc at a higher elevation, where they will be engaged by the top edge of the uppermost notch, will similarly be guided into the uppermost notch in close proximity to a stationary cutting edge.

As will be noted, the lower edges of the several notches are all inclined slightly from the horizontal, said lower edges declining in a direction toward the periphery of the disc to further insure the guiding of the stalks into the several notches in each of which there is a separate cutting action. The lower edge of the top notch is inclined to the least extent to the horizontal, the lower edge of the intermediate notch is inclined to a slightly greater extent from the horizontal, and the lower edge of the lowermost notch is inclined to the greatest extent. In other words, the inclinations of the lower edges of the several notches are not only opposite to the inclinations of the upper edges, but further, as regards the lower edge the inclination is greater in each notch, in a descending order in the series, while the inclination of the upper edges is greater in an ascending order from the lowermost to the uppermost notch of the series.

When the device is to be moved to another location, it can be rocked backwardly on the rear wheels, to elevate the stationary knife disc and rotary blade, after which it can be readily rolled to the next location at which the trimming operation is to be performed.

An important characteristic of the device is its ready maneuverability, the device being easy to operate, even around corners and curves, due to the fact that only a relatively small, lower portion of the stationary knife is disposed below the plane of the top surface of the walk, with only the extremities of the rotating knife blade cutting through the grass. Further, the device can be easily assembled or dissassembled for maintenance or repair operations, or for replacement of parts.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A lawn edge trimmer comprising a rollable frame adapted to support a prime mover; a drive shaft journaled in the frame; means for drivingly connecting the shaft to said prime mover; a stationary knife disc mounted on the frame adjacent one end of the shaft in a vertical plane, said disc having a series of side-by-side comb teeth defining combing notches between them, said series being formed on the leading edge of the disc with the uppermost notch of the series having a top edge intersecting the periphery of the disc at a point substantially horizontally aligned with the center point of the disc, the lowermost notch of the series having a lower edge intersecting the periphery of the disc at a point substantially horizontally aligned with the point of contact between said rollable frame and the ground surface, said notches all having their top edges inclined from the horizontal in a direction toward the periphery of the disc from the inner ends of the notches, for guiding into the notches stalks lying across the plane of the disc at different elevations between horizontal planes passing through the disc center and said point of contact, and for cutting of the stalks so guided against edges of the several notches; and an elongated knife blade extending diametrically of the disc and secured to the shaft for rotation therewith, said blade being disposed in face-to-face contact with said disc and traversing said edges when rotated with the shaft to shear the stalks within said notches.

2. A lawn edge trimmer comprising a rollable frame adapted to support a prime mover; a drive shaft journaled in the frame; means for drivingly connecting the shaft to said prime mover; a stationary knife disc mounted on the frame adjacent one end of the shaft in a vertical plane, said disc having a series of side-by-side comb teeth defining combing notches between them, said series being formed on the leading edge of the disc with the uppermost notch of the series having a top edge intersecting the periphery of the disc at a point substantially horizontally aligned with the center point of the disc, the lowermost notch of the series having a lower edge intersecting the periphery of the disc at a point substantially horizontally aligned with the point of contact between said rollable frame and the ground surface, said notches all having their top edges inclined from the horizontal in a direction toward the periphery of the disc from the inner ends of the notches, for guiding into the notches stalks lying across the plane of the disc at different elevations between horizontal planes passing through the disc center and said point of contact, and for cutting of the stalks so guided against edges of the several notches, the bottom edges of the several notches also being inclined slightly from the horizontal, in a direction downwardly toward the periphery of the disc from the inner ends of the notches; and an elongated knife blade extending diametrically of the disc and secured to the shaft for rotation therewith, said blade being disposed in face-to-face contact with said disc and traversing said teeth and notches when rotated within the shaft for cutting the stalks within the notches.

3. A lawn edge trimmer comprising a rollable frame adapted to support a prime mover; a drive shaft journaled in the frame; means for drivingly connecting the shaft to said prime mover; a stationary knife disc mounted on the frame adjacent one end of the shaft in a vertical plane, said disc having a series of side-by-side comb teeth defining combing notches between them, said series being formed on the leading edge of the disc with the uppermost notch of the series having a top edge intersecting the periphery of the disc at a point substantially horizontally aligned with the center point of the disc, the lowermost notch of the series having a lower edge intersecting the periphery of the disc at a point substantially horizontally aligned with the point of contact between said rollable frame and the ground surface, said notches all having their top edges inclined from the horizontal in a direction toward the periphery of the disc from the inner ends of the notches, for guiding into the notches stalks lying across the plane of the disc at different elevations between horizontal planes passing through the disc center and said point of contact, and for cutting of the stalks so guided against edges of the several notches, the bottom edges of the several notches also being inclined slightly from the horizontal, in a direction downwardly toward the periphery of the disc from the inner ends of the notches, the inclination of the top edges of the notches from the horizontal being progressively greater in an order ascending from the lowermost to the uppermost notch and the inclination of the bottom edges of the notches being progressively greater in an order descending from the uppermost to the lowermost notch; and an elongated knife blade extending diametrically of the disc and secured to the shaft for rotation therewith, said blade being disposed in face-to-face contact with said disc and traversing said teeth and notches when rotated with the shaft, for cutting the stalks within the notches.

References Cited in the file of this patent
UNITED STATES PATENTS

| 2,410,196 | Benthall | Oct. 29, 1946 |
| 2,630,665 | Lauer | Mar. 10, 1953 |
| 2,706,879 | Barrentine | Apr. 26, 1955 |